Dec. 12, 1967   W. C. DEAN II   3,357,210
CONSTANT VELOCITY UNIVERSAL JOINT
Filed Dec. 27, 1965

INVENTOR.
Walter C. Dean II
BY
Herbert Furman
ATTORNEY

United States Patent Office 3,357,210
Patented Dec. 12, 1967

3,357,210
CONSTANT VELOCITY UNIVERSAL JOINT
Walter C. Dean II, Granby, Conn., assignor to General Motors Corporation, Detroit, Mich., a corporation of Delaware
Filed Dec. 27, 1965, Ser. No. 516,577
6 Claims. (Cl. 64—21)

ABSTRACT OF THE DISCLOSURE

A constant velocity universal joint includes outer and inner members, each provided with corresponding alternated angled grooves forming crossed groove pairs. The inner member carries an articulated spider within an elongated central cavity, the spider having arms extending through radial slots into the groove pairs where they retain pairs of hemispherical torque-transmitting members.

---

This invention relates generally to universal joints and more specifically to a crossed groove type constant velocity universal joint having an articulated spider.

One feature of this invention is that it provides a constant velocity universal joint which permits the joint members to slip axially relative to each other and maintains the torque transmitting elements in the homokinetic plane without requiring a cage for such elements. Another feature of this invention is that the force transmitting elements are mounted in pairs on relatively rotatable spider arms. A further feature of this invention is that the spider arms rotate coplanarly about a common axis. Yet another feature of this invention is that the force transmitting elements have individually rotatable portions engageable with complementary pairs of grooves in the joint members.

These and other features of the invention will be readily apparent from the following specification and drawing wherein.

Figure 1:
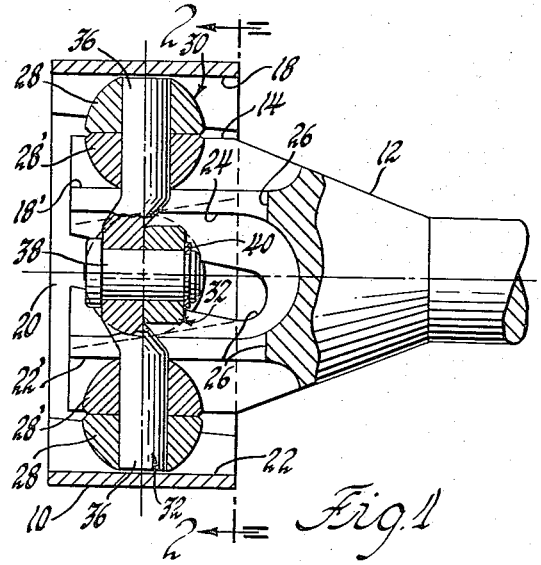
FIGURE 1 is a partially broken away side view of a universal joint according to this invention.
Figure 2:
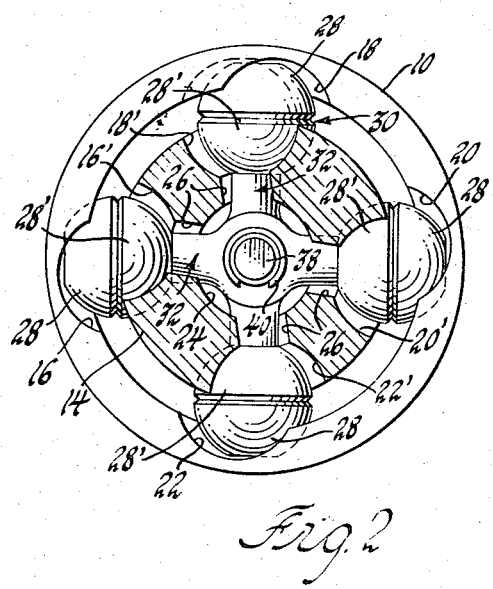
FIGURE 2 is a sectional view of the joint taken generally on the plane of line 2—2 of FIGURE 1.
Figure 3:
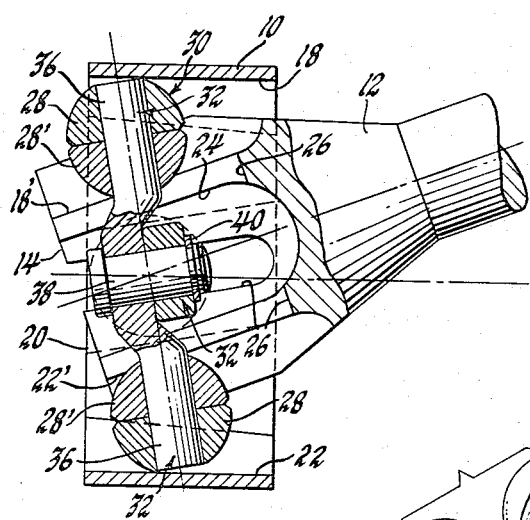
FIGURE 3 is a view similar to FIGURE 1 showing the joint in angular displacement.

Referring now to FIGURES 1 through 3, the universal joint comprises a cylindrical outer race or member 10 and a frusto-conical inner race or member 12 which terminates in a cylindrical portion 14. Member 10 includes four circumferentially spaced grooves 16, 18, 20, 22, while member 12 includes similar grooves 16', 18', 20', 22', arranged complementary to the outer member grooves.

As best seen in FIGURES 1 and 2, each groove is angled with respect to the axis of its respective joint member and its complementary groove is oppositely and equally angled. Thus, the complementary grooves are crossed with respect to each other and symmetrically crossed with respect to the joint axis when the joint is aligned, as in FIGURE 1. The adjacent grooves on each joint member, such as 18 and 20, are oppositely crossed and thus deviate angularly from the longitudinal axis of their respective joint members in opposite circumferential directions. The grooves may be of either straight or helical configuration.

Member 12 has a bore 24 that is connected to grooves 16', 18', 20', 22' by elongated radial slots 26. A plurality of antifriction force transmitting elements or ball half pairs 28, 28' drivingly interconnect the complementary grooves and are positioned in the grooves by an articulated spider 30.

Figure 4:
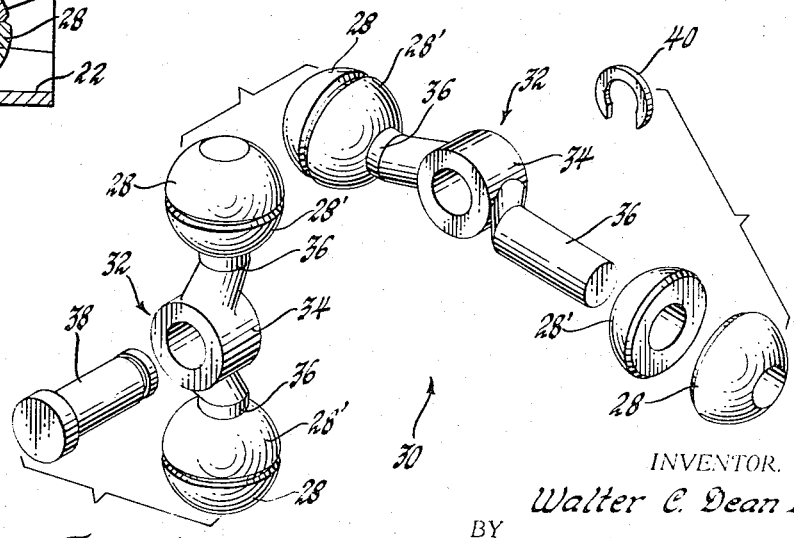
FIGURE 4 is an exploded perspective view of the spider.

As best seen in FIGURE 4, the spider 30 comprises a pair of relatively rotatable crossed arms 32. Each arm 32 includes a cylindrical hub 34 and a pair of offset radially extending trunnions 36. Trunnions 36 are offset to permit the axes of all of the trunnions to be coplanar with the interface of the hubs 34. Each trunnion 36 has slidably and rotatably mounted thereon a pair of the ball halves 28, 28'. The arms 32 are pivoted together by a headed pin 38 and spring clip 40. The arms 32 can thus rotate relative to each other about the pin axis and the ball half pairs 28 and 28' are capable of relative rotation about coplanar trunnion axes normal to the pin axis. Spider hubs 34 are received within bore 24 and the trunnions 36 project through slots 26 to position ball halves 28 and 28' in the complementary grooves.

Considering member 12 as the driver, the operation of the joint is as follows: Force is transmitted from member 12 through grooves 16', 18', 20', 22' to ball halves 28', thence to trunnions 36, to ball halves 28 and to member 10 through grooves 16, 18, 20, 22.

As shown in FIGURE 3, angular displacement of the universal joint will constrain the ball elements and the spider to move in the homokinetic plane to provide constant velocity. The crossed grooves preclude alignment of more than one pair of complementary grooves at any single instant at any angular orientation of the joint. Since at least three pairs of complementary grooves, such as 16–16', 18–18', and 22–22' in FIGURES 3 will always be crossed, the coplanar arrangement of the ball half pairs 28, 28' in the homokinetic plane will be assured by confinement at the groove intersections.

The combination of the crossed grooves and the articulated spider permits axial slip of the universal joint in any angular orientation. As best seen in FIGURE 2, if member 12 is withdrawn from member 10, inner grooves 16' and 18' will force adjacent ball halves 28' apart, as will grooves 20' and 22', causing the spider 30 to articulate. Ball halves 28 will then ride outwardly in grooves 16 and 18 and in grooves 20 and 22, forcing the spider to withdraw from member 12.

The force transmitting elements are preferably pairs of ball halves, although solid balls or pairs of antifriction elements of other shapes could be used. The illustrated arrangement will prevent scuffing of the force transmitting members, which occurs due to the deviation of the ball contact axis from the spin axis, since each ball half contacts only one groove. Hence, deviation of the contact axis from the spin axis will merely produce relative rotation of the ball halves and rubbing at the flat interface, while eliminating scuffing of the spherical surfaces and the groove surface.

Many modifications of the illustrated universal joint are possible without departing from the scope or spirit of the invention set forth herein.

What is claimed is:
1. A constant velocity universal joint comprising a first member having at least four circumferentially spaced grooves, a second member spaced from the first member and having circumferentially spaced grooves each complementary to a first member groove and crossed with respect thereto, and torque-transmitting means including a spider having at least a pair of crossed arms relatively rotatable about a common axis and torque-transmitting elements positioned by the arms in the grooves, the first member, second member and torque-transmitting means being axially movable relative to each other.

2. The universal joint of claim 1 wherein the spider arm axes extend coplanarly from the common axis.

3. The universal joint of claim 2 wherein the torque transmitting elements comprise pairs of ball halves rotatably mounted on each arm.

4. The universal joint of claim 1 wherein each torque transmitting element comprises a pair of relatively rotatable ball halves carried on each spider arm.

5. The universal joint of claim 4 wherein the axes of rotation of all ball halves are coplanar in all positions of the spider.

6. The universal joint of claim 5 wherein the second member has an elongated central cavity connected to its grooves by radially extending elongated slots and the spider is carried within the cavity, the arms extending through the slots into the grooves.

References Cited

UNITED STATES PATENTS

| 1,072,612 | 9/1913 | Hermann | 64—21 |
| 2,239,675 | 4/1941 | Hanft et al. | 64—21 |
| 2,685,784 | 8/1954 | Wildhaber | 64—21 |

FOREIGN PATENTS

| 65,127 | 9/1955 | France. |
| 1,078,962 | 5/1954 | France. |
| 1,175,941 | 11/1958 | France. |

HALL C. COE, *Primary Examiner.*